United States Patent [19]

Cavallerano et al.

[11] Patent Number: 5,087,970
[45] Date of Patent: Feb. 11, 1992

[54] SYSTEM FOR PROVIDING A HIGH DEFINITION TELEVISION (HDTV) AUGMENTATION CHANNEL COMPRISING TIME AND FREQUENCY MULTIPLEXED COMPONENTS

[75] Inventors: Alan P. Cavallerano, Ossining; Karl Wittig, New York; Mikhail Tsinberg, Riverdale, all of N.Y.

[73] Assignee: North American Philips Corporation, New York, N.Y.

[21] Appl. No.: 542,461

[22] Filed: Jun. 22, 1990

Related U.S. Application Data

[63] Continuation-in-part of Ser. No. 239,148, Aug. 31, 1988, Pat. No. 4,945,411.

[51] Int. Cl.$^5$ .............................................. H04N 7/04
[52] U.S. Cl. ...................................... 358/141; 358/11; 358/12
[58] Field of Search ................. 358/141, 142, 146, 11, 358/12

[56] References Cited

U.S. PATENT DOCUMENTS

| | | |
|---|---|---|
| 4,882,614 | 11/1989 | Kegeyama et al. ................. 358/141 |
| 4,945,411 | 7/1990 | Cavallevano et al. .............. 558/141 |
| 4,977,454 | 12/1990 | Tsinberg ............................ 358/141 |

OTHER PUBLICATIONS

Pazarci et al., "A Matched-Resolution Wide Aspect-Ratio, HDTV System", IEEE, vol. 34, No. 1, Feb. 1988.

Primary Examiner—James J. Groody
Assistant Examiner—David E. Harvey
Attorney, Agent, or Firm—Michael E. Marion

[57] ABSTRACT

A high definition television system to provide an efficient use of bandwidths, derives from a high definition television source signal, composite main signals and composite line differential signals. These signals are divided into main center components and main panel components and line differential center components and line differential panel components. The line differential center components and main center components are then quadrature modulated and transmitted as a vestigial sideband signal over a first transmission path. The main panel components and the line differential panel components are quadrature modulated and formed into a vestigial sideband signal which is then time multiplexed with the high frequency luminance signal forming a time multiplexed signal. The time multiplexed signal is then frequency multiplexed with a digital sound and synchronization signal in order to form an augmentation signal which is transmitted over a portion of a second transmission path.

6 Claims, 5 Drawing Sheets

SYSTEM FOR PROVIDING A HIGH DEFINITION TELEVISION (HDTV) AUGMENTATION CHANNEL COMPRISING TIME AND FREQUENCY MULTIPLEXED COMPONENTS

This application is a continuation in part of U.S. Pat. application Ser. No. 239,148, now U.S. Pat. No. 4,945,411, which was filed on Aug. 31, 1988 and allowed on May 27, 1990. Other related applications are Nos. 239,091 and 239,096 both filed on Aug. 31, 1988; 057,848 and 057,849 both filed on June 2, 1987 and 346,323 filed May 5, 1989. These applications as well as U.S. Pat. Nos. 4,694,338; 4,794,456; 4,899,220 and 4,908,697 which have common inventorship with, and are assigned to the assignee of, the present application, are specifically incorporated by reference herein.

BACKGROUND OF THE INVENTION

The above referenced applications and patents describe embodiments of interrelated systems designed to deliver high definition television (HDTV) source signals utilizing conventional signal media. In other words, they provide solutions to the problem of taking a wide bandwidth HDTV source signal, converting it to a signal with a more narrow bandwidth, for example a 9.5 MHz satellite channel or a 6 MHz. terrestrial broadcasting channel (or portion thereof), in order to transmit/receive or record/reproduce it, and then recreating an HDTV display.

Parent application No. 239,148 described an embodiment of a so called "augmentation" or two channel approach to the transmission (or recording) and reception (or reproduction) of HDTV. This type of approach is most widely discussed as a method for terrestrial broadcasting HDTV in a manner which maintains compatibility with conventional (for example NTSC) television receivers.

HDTV source signals provide a wider aspect ratio picture (for example 16:9) and higher horizontal resolution (for example 495 TVL corresponding to about 16.8 MHz.) than do conventional television signals which have an aspect ratio of 4.3. The HDTV source signal can be a sequentially scanned (1:1) or interlaced (2:1) signal of, for example 525 or 1050 lines respectively, at a field rate which is compatible with conventional standards, for example 59.94 fields per second for NTSC. A conventional television signal (for example NTSC) provides a 525 line interlaced signal at that field rate.

The parent application describes a system in which an HDTV source signal is processed by an encoder to form two separate signals. The encoder derives from the wide aspect ratio source picture, a plurality of main signal components derived from selected lines of the HDTV source picture (i.e. Y1 and Y3) of every four lines of each field. These components, which include corresponding chrominance components are combined to create a composite (e.g. NTSC) signal. These main signal components are related to the center portion of the source picture having an aspect ratio of 4:3, and at least one, but normally two, panel portions comprising the balance of the wide aspect ratio source picture. The encoder also derives a plurality of line differential (LD) components from the source picture which are similarly divided into center and panel components. A high frequency luminance signal (Yh) is derived from one out of every four source lines. Digital audio and synchronization signals (DSS) are also provided by the encoder.

As described in the parent application, the main center components and the LD center components are modulated in quadrature with a first picture carrier in order to form a center signal which is receivable on conventional (i.e. NTSC) receivers. This center signal is a vestigial sideband (VSB) signal. The main panel portions (PL1/PR1 and PL3/PR3) of the source signal lines 1 and 3 respectively are quadrature modulated with a subcarrier to form a main panel double sideband signal (DSB). The LD panel portions (LDL2/LDR2 and LDL4/LDR4) for lines 2 and 4 respectively, are quadrature modulated with a subcarrier to form an LD panel DSB signal, double sideband being necessary due to the quadrature modulation.

In processing the augmentation signal therefore, the main panel components are processed separately from LD panel components, unlike the center signal processing where main and LD components are combined The Yh component is heterodyned onto a subcarrier and time multiplexed with the main panel and LD panel DSB signals to form a time multiplexed augmentation component which is then frequency multiplexed with another subcarrier which has been modulated by the DSS component, thereby forming an augmentation signal which, when combined with the center signal in an HDTV decoder, will provide an HDTV display.

A problem which is inherent in the packaging taught by the parent application however, is that augmentation information related to panel portions of the HDTV source signal is processed differently from the information related to the center portion. The main panel information and the LD panel information are processed separately as separate DSB signal components. On the other hand, the main center and the LD center components are quadrature modulated together to form the VSB center signal. It has been found that processing the center and panel HDTV portions in this dissimilar fashion, can increase the potential for artifacts in the reconstructed HDTV display which might arise from a differences in the transmission paths of the center and augmentation signals.

It is therefore an object of the instant invention to provide an HDTV augmentation system which is more robust and less susceptible to artifacts by packaging the main and augmentation signals in an improved fashion.

SUMMARY OF THE INVENTION

This disclosure builds upon the ideas presented in the parent application and the other related references incorporated herein. It provides for an augmentation HDTV system which can package the augmentation signal so that it takes up only a portion of a conventional television channel, for example 3 MHz, and yet is more robust than previous augmentation system embodiments in terms of potential performance capabilities in real-world terrestrial broadcast environments.

As was the case in the parent application, signal components derived from the HDTV source signal are expanded in time which is advantageous for noise and echo (ghost) reduction and minimizing the effects of group delay distortions. In the present embodiment however, the system makes use of quadrature modulation for both the center and panel information in a way that has the efficiency of two DSB signals time expanded in quadrature, without the potential penalties introduced by channel imperfections. This efficiency is achieved by using VSB for the center signal, as in the parent application, and also using VSB for the augmentation signal. Each of these VSB signals comprise LD and main portions, with the low-bandwidth LD signal modulated in quadrature about the DC location of the main component. In other words, both the center components and panel components of the HDTV source signal are processed as VSB signals incorporating LD center and panel DSB signals respectively, which are modulated in quadrature about each carrier only to the extent of the VSB bandwidth.

Because both the center and panel components are treated identically from the perspective of modulation, i.e. the LD center component is modulated in quadrature with the main center component and the LD panel components are modulated in quadrature with the main panel components, more uniform performance of the center and panel portions (save for the difference in expansion to be discussed) will be provided, reducing the potential for dissimilar artifacts between center and panel portions because the LD is a low-energy vertical detail signal that is correlated to the main signal.

In the present embodiment of the invention, all of the video augmentation components (main panels, LD panels and Yh) are expanded by the same ratio for transmission which eases the implementation and design of the phase locked loops at the encoder and decoder.

DETAILED DESCRIPTION OF A PREFERRED EMBODIMENT OF THE INVENTION

As described more fully in the parent application, video components, i.e. line differential signals (LD), high (Yh) and conventional (Y1, Y3) frequency response luminance components, and chrominance components (I,Q) are provided to an HDTV encoder from either an HDTV RGB source or from an HDMAC-60 signal which is described in more detail in the references incorporated herein. The HDTV encoder provides an NTSC compatible center signal and a 3 MHz augmentation signal. At an HDTV decoder in an HDTV receiver, the center signal is combined with the augmentation signal to form an HDTV display. The center signal, generally unaffected by the HDTV processing, may also be viewed on a standard NTSC receiver.

Figure 1:
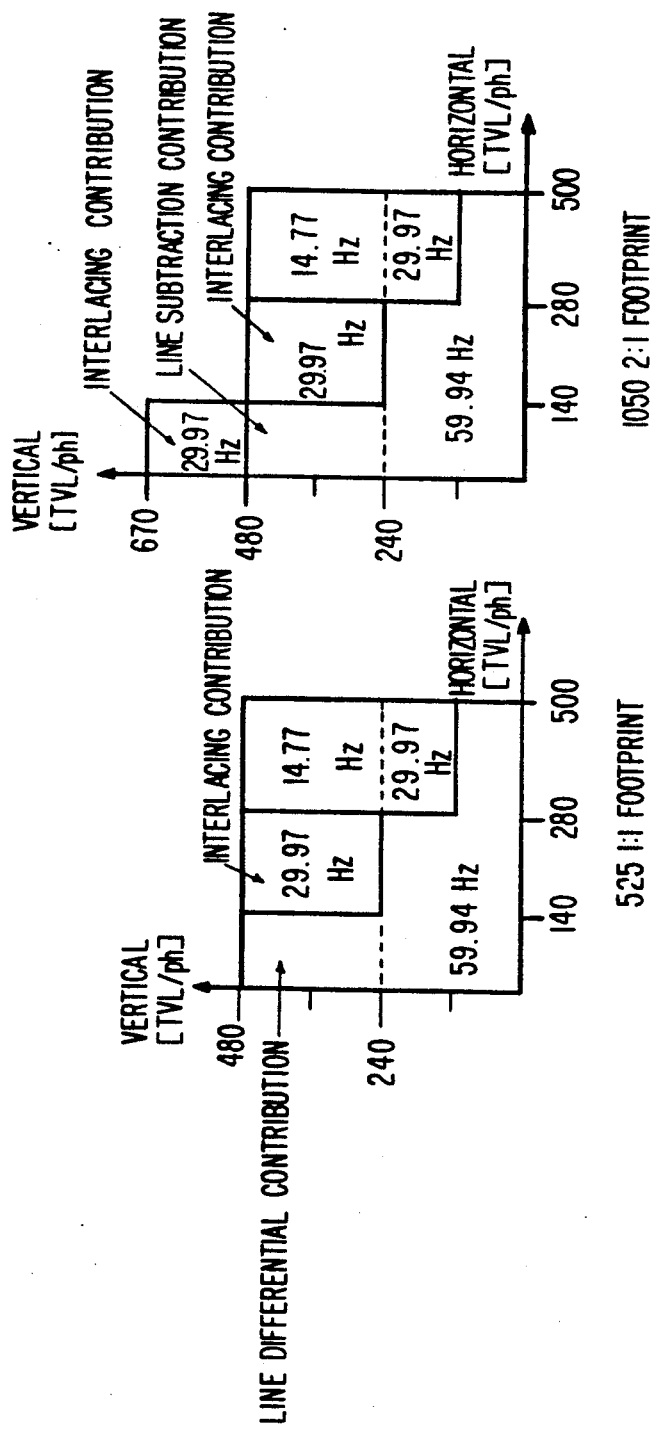
FIG. 1 describes the horizontal and vertical resolution delivered by the invention.

FIG. 1 describes the resolution that can be delivered with the instant invention for both a 525 line, 1:1 signal and a 1050 line, 2.1 signal. Due to the increase in the horizontal bandwidth and the wider aspect ratio image, 16.8 MHz corresponds to 495 television lines of resolution (TVL) horizontally. The chrominance resolution is comparable to NTSC. The aspect ratio of the picture is 16:9. The source signal provides at least 525 lines every 1/59.94 seconds.

In the parent application, DSB composite (luminance and chrominance interleaved) panel components were time expanded and modulated in quadrature with each other, which resulted in more precise channel performance requirements for successful demodulation due to the already existing chrominance quadrature modulation in the composite signals. In the instant invention, the efficiency of expansion is compromised with VSB, in that slightly less expansion in time is used (helping the time budget), in conjunction with slightly less utilization of the frequency budget. Overall however, the time-frequency budget is maintained between the two techniques.

If two DSB signals are time expanded by two, they each occupy twice the time that they normally would occupy, but each occupies half the bandwidth that each would normally occupy. If these signals are modulated in quadrature with each other, both signals exist at the same time, so the total time budget for the two expanded signals modulated in quadrature is constant as compared to the two signals without expansion transmitted without quadrature. Quadrature modulation however requires DSB transmission. After expansion by two in time, the DSB signal occupies half the bandwidth as compared to the signal with no expansion. The expanded DSB signals occupy the same bandwidth as an unexpanded single sideband (SSB) signal. This is a very efficient utilization of the time and frequency budget, but is not robust with respect to group delay distortions in a transmission channel that is not tightly controlled.

In the instant invention the time and frequency budget is utilized in a slightly different way. By using VSB for one component, and modulating another DSB component in quadrature over the DSB portion of the VSB signal, it can be argued that the quadrature leg component that is all DSB suffers from incomplete efficiency in the frequency domain. This is true because there is no component transmitted in that phase over the SSB portion of the VSB signal. It can also be argued however, that the time expansion of the VSB signal is smaller than the DSB example in the previous paragraph, because the overall VSB bandwidth is smaller than the DSB bandwidth. Thus, the slight loss in bandwidth efficiency is compensated by a better efficiency in the time domain.

Both the signal packaging described in the parent application and the invention described herein are time—frequency neutral. However, the signal packaging comprised in the instant invention is better for demodulation purposes in a real channel because the VSB signal used for the augmentation signal herein is, like the center signal, a composite signal with an imbedded subcarrier for chrominance, and is therefore better suited for VSB as opposed to DSB.

As explained fully in the references incorporated herein, line differential (LD) signals are generated for every other sequential source line, out of phase with the lines selected for transmission as the main center and panel portions. For example, assuming four source lines, LD signals are generated for lines 2 and 4 of a four line sequence of a given source 525 line progressive frame, and are referred to as LD2 and LD4. The LD signal contains information for the entire horizontal scan line.

Nominally, the HDTV source line time is 26 μsec. Separation of the 4.3 center portion out of the 16:9 total picture yields (4/3)/(16/9), or a factor of 75% for the center portion. Allowing for overlap redundancy (as described in the references) for wide aspect ratio decomposition and recombination, the total left and right LD time allocated is 6.9375 μsec. [(25%) (26 μsec.)=6.5 μsec. plus 0.4375 μsec. of redundancy].

The LD center portion is expanded, as is the main center portion, by a factor of 3.8. Because an LD signal, which is bandwidth limited to 3.3 MHz., represents a vertical-temporal deinterlacing signal it is highly correlated with the main picture content. Expansion of the LD center by the same ratio as the main center portion maintains this correlation. After expansion, the LD center portion line time is consistent with the nominal NTSC active line time, i.e (75%) (26 microseconds) (8/3)=52 microseconds. Expansion in time reduces the bandwidth of the LD center to ($\frac{3}{8}$) (3.3 MHz), or nominally 1.2375 MHz per sideband. The time-expanded LD center component is then modulated in quadrature with the main center component to form the center signal.

The components comprising the augmentation channel can be described on the basis of four high definition source lines, which total nominally 127.11 μsec. These components are tabulated in Table I. In the instant invention, the components to be delivered over the 3 MHz augmentation channel are time expanded and modulated in order to optimize the time and frequency budget.

Both the center and augmentation signals are VSB signals in which the LD components are transmitted as DSB signals with a bandwidth of 1.25 MHz. Because the LD components which are modulated in quadrature in this DSB region are expanded by the factor of 3:8, the original base bandwidth of the LD components are restricted to (1.25 MHz) (8/3), or 3.3 MHz.

FIG. 1 describes the frequency budget of the augmentation signal. The line times of the signal components to be transmitted can be summarized as follows:

3.3 MHz baseband LD2: Panel Left 2 & Panel Right 2: 6.9375 usec 3.3 MHz baseband LD4: Panel Left 4 & Panel Right 4: 6.9375 usec 11.2 MHz to 16.8 MHz Yh sideband (5.6 MHz total): 26 usec 4.2 MHz baseband Panel Left 1 & Panel Right 1, NTSC luma/chroma: 18.5 usec 4.2 MHz baseband Panel Left 3 & Panel Right 3, NTSC luma/chroma: 18.5 usec 440 kbps DSS continuously present, or other state-of-the-art DSS The components of the augmentation channel are time expanded in order to reduce their base bandwidths for transmission over a 3 MHz channel. The digital audio and sync information requires about 0.2 MHz in this invention, which results in 2.8 MHz being available for the video components. Because quadrature modulation is used for the LD panels within the 1.25 MHz vestige of the main panel VSB signal, the 3.3 MHz LD panel component must be expanded by 3.8 to be coherent with the NTSC scan rate. The LD panel information is reduced in frequency to 1.2375 MHz, and then time expanded to 18.5 usec. Note that this time period corresponds to the same time period as the composite main panels, and the nominal bandwidth, including filter skirts, is consistent with the vestige of 1.25 MHz. In this way, the expanded LD panel components can be modulated in quadrature with the main panel components forming a quadrature modulated panel signal. The modulated package is then expanded by 1:2 to satisfy the time and frequency budget of the 3 MHz augmentation channel.

The Yh signal is not transmitted in quadrature, and hence only one 2.8 MHz sideband is required after expansion, to be time multiplexed with the quadrature modulated VSB panel signal to form the augmentation signal.

As shown in Table I, Yh is expanded in time by a factor of 1:2. The main and LD panels are both expanded in time by a factor of 1:2 in addition to an implicit expansion by 3:8, due to the fact that the center portion of the HDTV source picture makes up $\frac{3}{4}$ of the total wide aspect ratio coupled with an addition factor of $\frac{1}{2}$, resulting in an overall factor of (3/4) ($\frac{1}{2}$)=$\frac{3}{8}$. The expansion results in components that occupy a smaller bandwidth but require more line time. The time-expanded components are listed in the Table I with their corresponding bandwidths and line-time requirements. Main and LD panel components for a particular line occupy 37 usec. after expansion.

Figure 2:
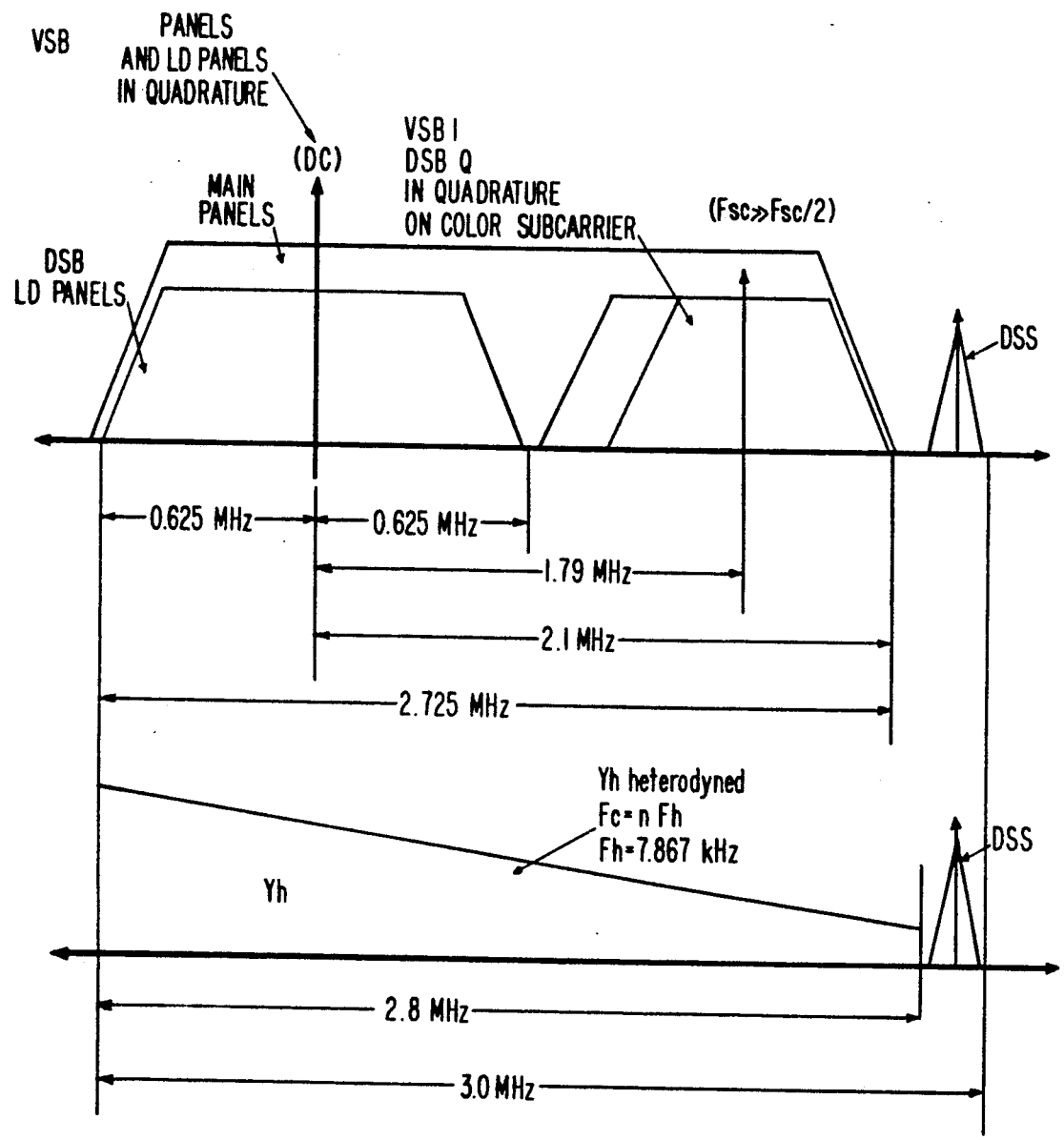
FIG. 2 describes the frequency budget of an augmentation signal comprising the invention.
Figure 3:
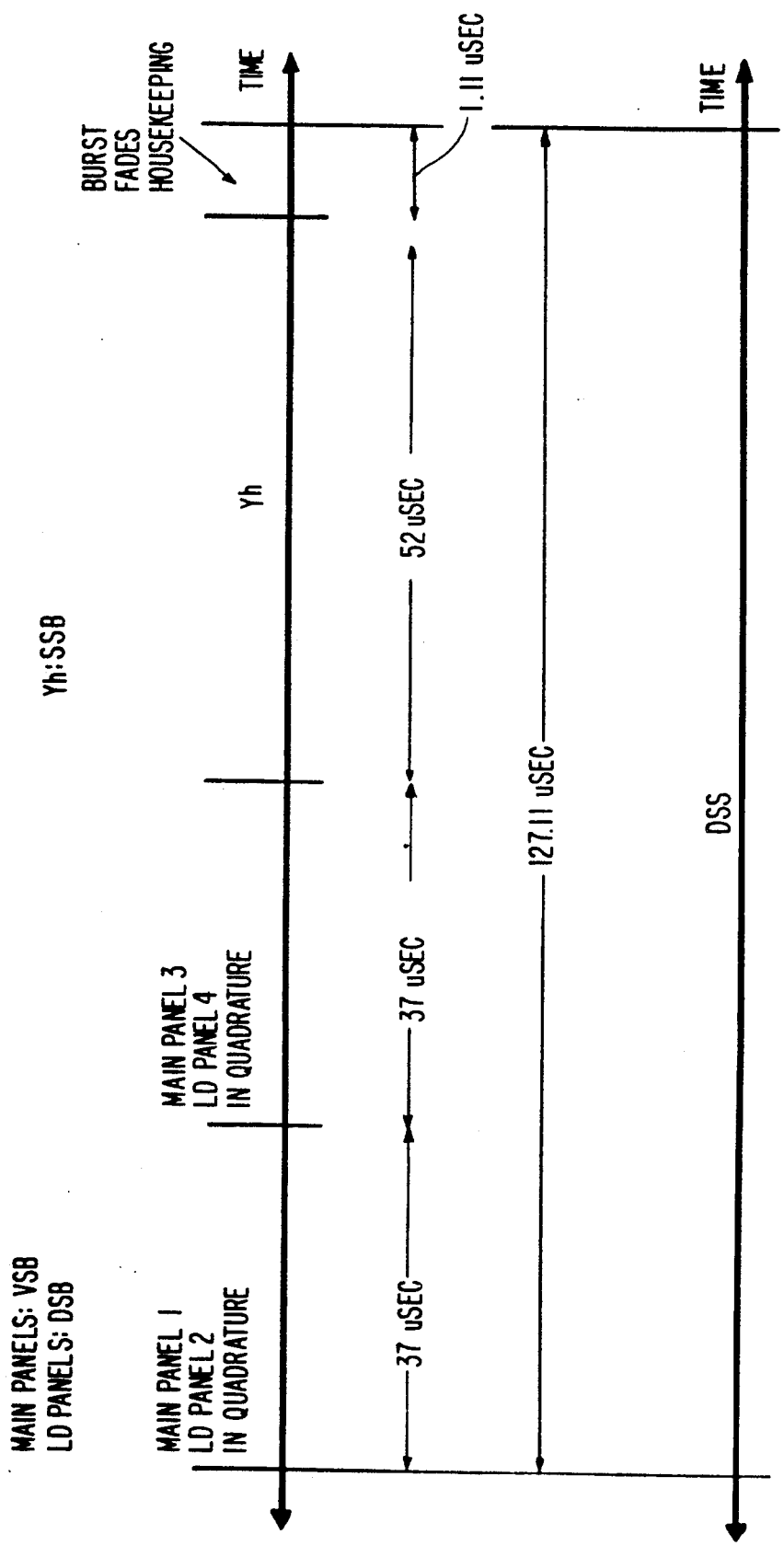
FIG. 3 describes the time budget of an augmentation signal comprising the invention.
Figure 4:
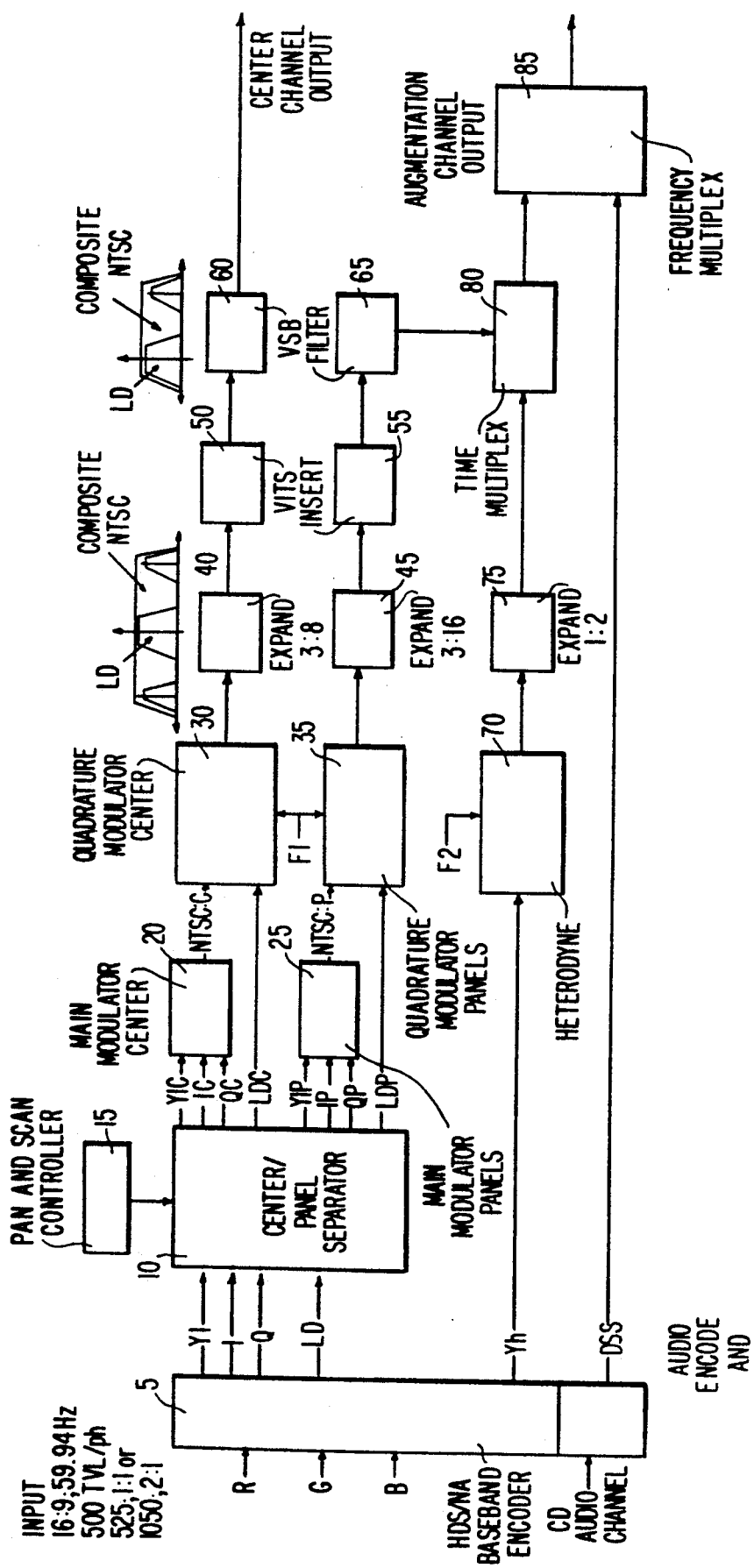
FIG. 4 is a block diagram of an encoder comprising an embodiment of the invention.

The time budget for these components on the 127.11 μsec. superline of the augmentation signal is shown in FIG. 2. The time budget shown is meant to be representative of a typical line configuration, and other arrangements of the components in time on the line are possible.

TABLE I

| COMPONENTS | ORIGINAL TIMEBASE & BASE BANDWIDTH | EXPANSION FACTOR | TIMEBASE & BASE BANDWIDTH |
|---|---|---|---|
| MAIN PANELS PL1 & PR1 PL3 & PR3 | 6.5+0.4375 μSEC OVERLAP 11.2 MHz | (3:8)(1:2) =3:16 | 37 μSEC 2.1 MHz |
| LD PANELS: PL2 & PR2 PL4 & PR4 | 6.5+0.4375 μSEC OVERLAP 3.3 MHz | (3:8)(1:2) =3:16 | 37 μSEC 0.62 MHz |
| Yh | 26 μSEC 5.6 MHz | 1:2 | 52.00 μSEC 2.8 MHz |
| DSS | 127.11 μSEC 440 Kbps | QPSK | 127.11 μSEC 0.2 MHz (total bandwidth) |

As described in the references, the high frequency luminance information, Yh, is decimated vertically so as to be present for one of every four source lines. In this way the diagonal resolution is limited, but well tailored to the human visual system. Varying the decimation sequence allows for memory and motion compensation to increase the vertical resolution for Yh. After expansion, the Yh signal is heterodyned to be time multiplexed with the quadrature modulated panel signal. The modulating frequency is chosen to permit the Yh frequency band after modulation, to coincide with the frequency allocation of the quadrature modulated components. This allows for optimum channel usage. Either the upper or lower sideband of the heterodyned Yh signal may be used. The Yh signal after expansion occupies 52 microseconds.

The digital sound and synchronization information can result from QPSK modulation of Dolby Adaptive Delta Modulated (ADM) signals, for example. For ADM the data rate is 408 kilobits, and an additional 32 kilobits per second could be added for synchronization. Therefore, the total bit rate for the DSS packet is 440 kilobits per second. Using QPSK, the channel can accommodate two bits per hertz, which means that the DSS packet would then require 0.2 MHz of total bandwidth continuously. This packet is modulated on a subcarrier and frequency multiplexed with the heterodyned Yh signal and the quadrature modulated panel signal.

The DDS packet may be modulated as shown in FIG. 2 so as to be placed above the upper sideband of Yh, thus taking advantage of the natural rolloff of the Yh video signal. However, it may also be desirable to modulate to the lower boundary of the Yh signal which is probably more energetic than the upper bound and would allow the channel filters to touch the upper boundary of the Yh signal. This might allow for better control of the frequency recombination of Yh with the baseband low-frequency luminance components, i.e. Y1 and Y3, when reconstructing the total wideband luminance signal, because the effect of the channel filter will not be present on the lower boundary of the Yh signal.

As discussed in the references incorporated herein, very precise phase recovery can be achieved at the HDTV receiver and therefore the potential for a quadrature phase error is minimal. Moreover, the correlation effect of LD and the main picture components also minimizes artifacts should phase recovery not be perfect. This is an improvement due in part to the nature of the signal packaging. Also, the LD signal is generally of low energy, which also supports the fact the potential errors are minimized.

FIG. 1 is a block diagram of an encoder comprising an embodiment of the invention. An HDTV source signal is provided which, in this case, is an RGB signal. The RGB signal is fed to an HDS/NA baseband encoder 5 which is described in the references incorporated herein, where it is divided into main luminance components (Y1 Y3) and chrominance components (I, Q), line differential components (LD2, LD4), and a high frequency luminance component (Yh). The baseband encoder 5 also provides a digital sound and sync signal (DSS). These components can also be provided by an HDMAC-60 decoder. The Y, I, Q and LD components are then separated into main center components (Yc, Ic, Qc), main panel components (Yp, Ip, Qp), and LD center (LDC) and panel (LDP) signals, in separator 10, under the control of the pan-and-scan control block 15. The main center Yc, Ic, and Qc components are fed into an NTSC modulator 20, and the panel Yp, Ip, and Qp components are fed into an NTSC modulator 25, providing composite center and composite main panel signals respectively.

The main center signal and the LD center signal, (which has been bandlimited and properly time-aligned to be correlated, in the separator 10) are fed into the quadrature modulator 30 providing a quadrature modulated center signal. Similarly, the main and LD panel signals are processed by quadrature modulator 35 providing a quadrature modulated panel signal. A convenient IF local oscillator carrier F1 is selected as the quadrature modulating frequency.

The quadrature modulated center signal is expanded by 3:8 in expander 40, and the quadrature modulated center signal is expanded by 3:16 (3:8 times 1:2) in expander 45. The extra expansion by 1:2 for the panel signals allows them to satisfy the time and frequency budget while also making the augmentation signal more robust in terms of group delay, echo, and noise performance.

A vertical interval training signal (VITS), is inserted into the modulated center signal in inserter 50, and into the modulated panel signal in inserter 55. The DSB quadrature modulated center and panel signals are then vestigial sideband filtered in VSB filters 60 and 65, respectively. These filters limit the lower sideband of the composite components to the lower sideband bandwidth of the respective LD components which is intentionally selected to be 1.25 MHz in the NTSC scan rate scale. The filtered VSB center signal is transmitted as the center signal which is sent over a conventional television channel and is receivable by a NTSC receiver.

With respect to the filtered VSB panel signal, the additional expansion factor of 1:2 limits the lower sideband bandwidth to 0.625 MHz. This signal is then time multiplexed with Yh as described below.

The Yh signal is heterodyned in mixer 70 using F2 as the suppressed carrier frequency. The heterodyned Yh signal is then time expanded 1:2 in expander 75 and time multiplexed in multiplexer 80 with the filtered VSB panel signal. In this way, Yh falls in the frequency domain within the extremities of the VSB panel signal. The time multiplexed signal is frequency multiplexed with the DSS signal in multiplexer 85 to form a signal having one 127.11 microsecond line and a 3 MHz. bandwidth. This signal, assembled at an intermediate frequency (IF), can then be frequency translated for transmission at RF as the augmentation signal.

Figure 5:
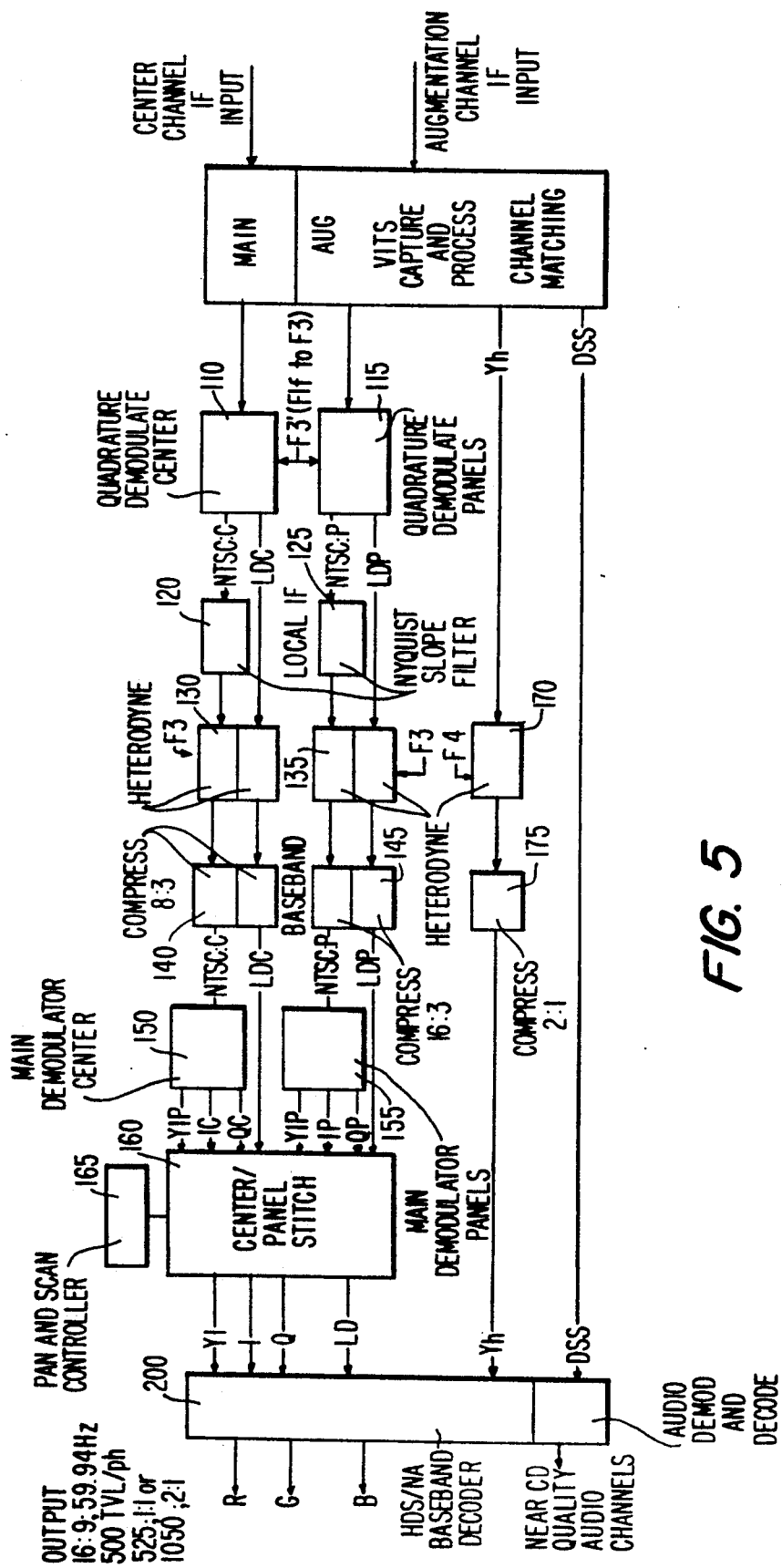
FIG. 5 is a block diagram of a decoder comprising an embodiment of the invention.

FIG. 5 describes a decoder comprising an embodiment of the invention. It is utilized in a HDTV receiver to decode the 3 MHz. augmentation signal and counter signal in order to provide a HDTV display corresponding to the HDTV source signal.

The center and augmentation signals, which may be at RF, are translated to a known IF using standard television demodulation procedure, and are provided to VITS capture and channel matching circuit 105. This circuit matches the center and augmentation information in terms of gain, timebase, etc., and extracts pan-and-scan data. Pilot carrier frequencies are also recovered for demodulation of the video components to be described. This circuit is discussed more fully in the references incorporated herein.

The center signal is demodulated in quadrature demodulator 110, providing main center and LD center components. Similarly, the augmentation signal is demodulated in quadrature demodulator 115, providing main and LD panel components. Although the DSB L,D center and panel signal components may be demodulated completely to baseband, the main VSB center and panel signal components must be demodulated to a secondary IF frequency in order that they may be Nyquist slope filtered in filters 120 and 125, respectively, a known procedure for VSB signals. In this embodiment, both the center and panel signals are first quadrature demodulated using a local carrier F3' to be brought down to a local IF, F3 for the Nyquist slope filtering. Then, all of the signals are heterodyned from F3 to DC using heterodyning blocks 130 and 135 for the center signals, and panel signals, respectively. After demodulating the center and panel components to baseband, these components are then compressed to compensate for their expansion during encoding. The center components are compressed by 8:3 in compressor 140 and the panel components are compressed by 16:3 in compressor 145, in order to create the correct scan rate for the HDTV display. The compression reflects the inverse ratios of the encoder expansion.

The main (composite) center and panel components are then demodulated in demodulators 150 and 155, respectively, in order to derive luminance (Y1,Y3) components and chrominance (I,Q) components for both center and panel portions of the video signal. These components are input to a center/panel stitch recombiner 160, described in the references incorporated herein. The LD center and panel components are also provided to recombiner 160, which reconstructs a wide aspect ratio picture from the center and panel information. The recombiner 160 operates in conjunction with the pan-and-scan controller 165 to properly "track" the relative proportions of the center and panel portions of the displayed picture, as described more fully in the references incorporated herein.

The Yh component, after gain, timebase, etc. correction in the VITS capture and processing circuit 105, is heterodyned to baseband in heterodyne block 170 and compressed 2:1 in compressor 175 to compensate for expansion during encoding. This allows Yh to occupy nominally 11.2 MHz to 16.8 MHz, as it did at the HDTV source signal.

The wide aspect ratio luminance, chrominance and LD signals from recombiner 160 and compressor 175 are input to the HDS/NA baseband decoder 200, described more fully in the references incorporated herein, which provides a HDTV wide aspect ratio television signal in RGB form.

The DSS component is also detected and processed by the VITS capture and processing circuit 105, and provided to baseband decoder 200, to provide near CD quality audio, as described more fully in the parent application and the references incorporated herein.

We claim:

1. A method for providing high definition television signals for transmission or recording, comprising the steps of:
   a) deriving from a high definition wide aspect ratio source signal, a high frequency luminance signal, a digital signal packet, a plurality of main composite signals and a plurality of line differential signals;
   b) separating said main composite signals into main center components and main panel components;
   c) separating said line differential signals into line differential center components and line differential panel components;
   d) quadrature modulating said main center components with said line differential center components so as to form a quadrature modulated center signal;
   e) quadrature modulating said main panel components with said line differential panel components so as to form a quadrature modulated line differential panel signal;
   f) filtering said quadrature modulated center signal to form a vestigial sideband center signal and filtering said quadrature modulated panel signal to form a vestigial sideband panel signal;
   g) time multiplexing said high frequency luminance signal with said vestigial sideband panel signal so as to form a time multiplexed signal; and
   h) frequency multiplexing said time multiplexed signal with said digital signal packet thereby forming an augmentation signal.

2. The method described in claim 1 further comprising the steps of:
   a) transmitting said vestigial sideband center signal over a first transmission path; and
   b) transmitting said augmentation signal over a portion of a second transmission path.

3. An apparatus for providing high definition television signal for transmission or recording, comprising:
   a) means for deriving from a high definition television aspect ratio source signal, a high frequency luminance signal, a digital signal packet, a plurality of main composite signals and a plurality of line differential signals;
   b) means for separating said main composite signal into main center components and main panel components;
   c) means for separating said line differential signals into line differential center components and line differential panel components;
   d) means for quadrature modulating said main center components with said line differential center components so as to form a quadrature modulated center signal;
   e) means for quadrature modulating said main panel components with said line differential panel components so as to form a quadrature modulated line differential panel signal;
   f) means for forming a vestigial sideband center signal from said quadrature modulated center signal;
   g) means for forming a vestigial sideband panel signal from said quadrature modulated panel signal;
   h) means for time multiplexing said high frequency luminance signal with said vestigial sideband panel signal so as to form a time multiplexed signal; and
   i) means for frequency multiplexing said time multiplexed signal with said digital signal packet thereby forming an augmentation signal.

4. The apparatus of claim 3, further comprising:
   a) means for transmitting said center vestigial sideband signal over a first transmission path; and
   b) means for transmitting said augmentation signal over a portion of a second transmission path.

5. The method described in claim 1, further comprising the steps of:
   a) detecting said vestigial sideband center signal and said augmentation signal and deriving therefrom, a quadrature modulated center signal, said quadrature modulated panel signal, said high frequency luminance signal, and said digital signal packet;
   b) demodulating said quadrature modulated center signal deriving therefrom, said main center components and said line differential center components;
   c) demodulating said quadrature modulated panel signal deriving therefrom said main panel components and said line differential panel components;
   d) combining said main center components and said line differential center components into a center portion signal;
   e) combining said main panel components with said line differential panel components so as to form at least one panel portion; and f) combining said center portion, said panel portion, and said high frequency luminance signal into a high definition television display.

6. An apparatus for providing a high definition television display from the high definition television signal described in claim 3, comprising:
   a) means for detecting said vestigial sideband center signal and said augmentation signal and deriving therefrom, said quadrature modulated center signal, said quadrature modulated panel signal, said high frequency luminance signal, and said digital signal packet;
   b) means for demodulating said quadrature modulated center signal deriving therefrom, said main center components and said line differential center components;
   c) means for demodulating said quadrature modulated panel signal deriving therefrom, said main panel components and said line differential panel components;
   d) means for combining said main center components and said line differential center components into a center portion signal;
   e) means for combining said main panel components with said line differential panel components so as to form at least one panel portion; and
   f) means for combining said center portion, said panel portion, and said high frequency luminance signal into a high definition television display.

* * * * *